United States Patent [19]

Lahary et al.

[11] Patent Number: 5,322,923
[45] Date of Patent: Jun. 21, 1994

[54] SEMI-CRYSTALLINE, SEMI-AROMATIC COPOLYAMIDES

[75] Inventors: Pierre-Yves Lahary, Lyons; Jean Coquard, Grezieu-la-Varenne, both of France

[73] Assignee: Rhone-Poulenc Chimie, Courbevoie, France

[21] Appl. No.: 930,528

[22] PCT Filed: Mar. 22, 1991

[86] PCT No.: PCT/FR91/00235

§ 371 Date: Nov. 2, 1992

§ 102(e) Date: Nov. 2, 1992

[87] PCT Pub. No.: WO91/15537

PCT Pub. Date: Oct. 17, 1991

[30] Foreign Application Priority Data

Mar. 30, 1990 [FR] France .................. 90 04398

[51] Int. Cl.$^5$ .................................. C08G 69/28
[52] U.S. Cl. .................... 528/349; 528/340; 528/342; 528/347
[58] Field of Search ............ 528/349, 347, 342, 340

[56] References Cited

U.S. PATENT DOCUMENTS

| | | | |
|---|---|---|---|
| 4,111,921 | 9/1978 | Bier et al. | 528/349 |
| 4,163,101 | 7/1979 | Schade et al. | 528/347 |
| 5,109,106 | 4/1992 | Lahary et al. | 528/349 |

Primary Examiner—Morton Foelak
Attorney, Agent, or Firm—Burns, Doane, Swecker & Mathis

[57] ABSTRACT

The present invention relates to semi-crystalline, semi-aromatic copolyamides, derived from terephthalic acid and mixtures comprising an alkylpentamethylenediamine and hexamethylenediamine.

6 Claims, No Drawings

SEMI-CRYSTALLINE, SEMI-AROMATIC COPOLYAMIDES

The present invention relates to semi-crystalline, semi-aromatic copolyamides derived from terephthalic acid and mixtures comprising an alkylpentamethylenediamine and hexamethylenediamine, which have a bending temperature under load (abbreviated BTUL; standards : NF T 51005) under 1.8 MPa of at least 240° C., when these copolyamides are filled with one or more padding or reinforcing fillers of fibrous type and moulded. The present invention also relates to processes for the production of these copolyamides, as well as compositions, in particular for moulding, produced from these copolyamides.

Polyamides derived from aliphatic diamine(s) and aliphatic or aromatic carboxylic diacid(s) have already been known for a long time. Depending on their composition, these polyamides are semi-crystalline polymers having high melting points (m.p.) or completely amorphous substances having relatively low glass transition temperatures (Tg).

Semi-crystalline polyamides are advantageously used when it is desired to produce formed articles which have a good thermomechanical stability at high temperature. The best known of the semi-crystalline polyamides is polyamide 6.6 (polymer of hexamethylenediamine and adipic acid); this polyamide is easily convertible by the melt route, but, because of a low Tg of about 50° C., it finds fields of application which are restricted to those involving use temperatures which remain below 100° C. Other semi-crystalline polyamides have been disclosed which have a higher Tg and, consequently, a better retention of the mechanical property values as a function of temperature. A polyamide of this type which is of particular value is that obtained from terephthalic acid and 2-methylpentamethylene-1,5-diamine (cf. JP-A-69/019.551) because of the possibility of obtaining a Tg of the order of 142° C.; the stability to heat is clearly noted with a polyamide of this type, but it has been found that:

if this polymer is filled with a padding or reinforcing filler of fibrous type and then converted by injection moulding under industrially economic conditions using a cold mould, that is to say a mould kept at a temperature of between 100° and 150° C., with short cooling times (the time concerned is the minimum time for which the injected material must be kept in the mould to enable the part to be ejected without deformation or to enable the moulded product to fall from the mould without difficulty), that is to say cooling times of between 20 and 40 seconds, it is not possible to obtain a high BTUL under 1.8 MPa able to reach and exceed 240° C. It has been found that this BTUL is, for example, 145°-150° C. for moulded articles filled with 10 to 60% by weight of glass fibres (relative to the weight of the total polyamide+filler) and obtained by the cold mould technique. The production, under these moulding conditions, of a low value for the BTUL is to be related to a low capacity for crystallisation of the polyamide under consideration obtained from terephthalic acid and alkylpentamethylenediamine, which has the result that when cooled rapidly, in particular when it is injected into a cold mould, the said polyamide does not crystallise or does so only partially. The articles obtained may then be amorphous; moreover, they are liable to change as a result of a crystallisation during reheating. It is understood that this type of semi-aromatic polyamide is useable only when using a hot mould, that is to say a mould kept at a temperature of between 170° and 200° C., with long cooling times, that is to say cooling times of between 2 and 4 minutes, and consequently their development remains very limited.

European Patent No. 0,347,848 also discloses semi-crystalline polyamides obtained from terephthalic acid, 2-methylpentamethylenediamine and an aromatic emine.

The use of a semi-crystalline, semi-aromatic polyamide based on recurring units derived from terephthalic acid and alkylpentamethylenediamine, for moulding under industrially economical conditions, therefore rests on the need to modify its capacity for crystallisation. On leaving the cold mould, the polymer must have acquired a semi-crystalline morphology throughout the mass of the part.

Continuing work in this field of the art, the Applicant has found:

that the rate of crystallisation may be increased to a level such that it is possible to produce mouldings in a cold mould and to obtain, in particular, moulded articles having, when they are filled with at least one padding or reinforcing filler of fibrous type, a FTUL under 1.8 MPa of at least 240° C., by preparing copolyamides by using, alongside terephthalic acid, an amine reagent comprising an alkylpentamethylenediamine and hexamethylenediamine.

More specifically, the present invention relates to the semi-crystalline, semi-aromatic copolyamides obtained from reagents comprising terephthalic acid (or a derivative) and 2-methylpentamethylenediamine, these copolyamides being characterised by the following points:

they contain in their structure recurring units of formula (I), (II), (III) and (IV), (I) denoting the structure:

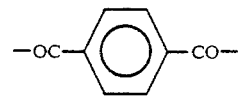

(II) denoting the structure:

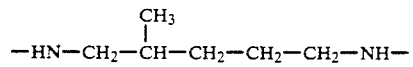

(III) denoting the structure:

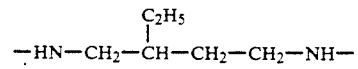

(IV) denoting the structure:

the units of formula (III) being optional, the molecular ratio of units (I) with respect to the sum of units (II)+(III)+(IV) is 1;

the amount of units (III) in the mixture (II)+(III) is in the range ranging from 0 to 5 mol % and that of the units (II), with respect to the same reference, is in the range ranging from 100 to 95 mol %;

the amount of units (IV) in the mixture (II)+(III)

+(IV) is in the range ranging from 40 to 90 mol %; and they also contain a proportion of non-conforming units derived from bis-hexamethylenetriamine, expressed as a percentage by weight of bis-hexamethylenetriamine with respect to the weight of the copolyamide obtained, which is less than 0.5% and more precisely is within the range ranging from 0.01 to 0.5%.

If the amount of units (IV) becomes greater than 90 mol %, the melting point (m.p.) of the copolyamides obtained increases to a level such that the difference between the m.p. and the decomposition temperature of the copolyamide becomes too small, that is to say a difference having values of less than 30° C., and the copolyamide is degraded during its conversion by injection moulding and the thermomechanical properties of the moulded articles obtained are reduced.

If the amount of units (IV) becomes less than 40 mol %, it has been found that the capacity of the copolyamides for crystallisation is insufficient and that it is not possible to obtain the desired BTUL values. More precisely, the thermal melting-crystallisation properties are determined by differential calorimetric analysis (DSC) using a METTLER type TA 3000 DSC 30 apparatus, operating under nitrogen and using a well-defined heat cycle, which will be defined below. The following values are used from the results obtained: m.p.=temperature at the top of the melting peak; Tcr=temperature at the top of the crystallisation peak during cooling; $\Delta T = $ m.p. $-$ Tcr. The temperature difference $\Delta T$ is lower the greater the capacity of the copolyamide for crystallisation. If the amount of units (IV) becomes less than 40 mol %, it has been found that the temperature difference $\Delta T$ assumes values which correspond to an inadequate capacity for crystallisation, which are higher than 60° C.

According to a preferential modality, the copolyamides of the present invention have a structure as defined above, in which the amount of units (IV) in the mixture (II)+(III)+(IV) is within the range ranging from 45 to 75 mol %; under these conditions the temperature difference $\Delta T$, which is low, assumes values which are within the range ranging from 10° to 55° C.

With regard to their molecular values, the copolyamides according to the present invention (taken in its general preferential subject) have:

viscosity characteristics, expressed as the viscosity index (IV) measured in accordance with the standard ISO R 307 (2nd Edition, 1984) on a solution containing 0.5 g of polymer (dried for 2 hours at 60° C. while sweeping with argon) in 100 cm³ of metacresol or of 95% by weight concentrated $H_2SO_4$, which are at least 60 ml/g and way be between 80 and 250 ml/g; and number-average molecular masses (Mn), determined by determining the end groups and the non-conforming units, which are at least 9,000 g/mol and may be between 10,000 and 25,000 g/mol.

With regard to their thermomechanical values, the copolyamides according to the present invention (taken in its general or preferential subject) have, in particular:

Tgs, measured by DSC analysis, which are at least 120° C. and may be between 125° and 140° C.; and BTULs under 1.8 MPa, determined in accordance with the standard NF T 51005, which are at least 240° C. and may be between 250° and 310° C., when the copolyamides are filled with, for example, 10 to 60% by weight (with respect to the weight of copolyamide+-filler) of at least one padding or reinforcing filler of fibrous nature.

The units of formula (I) originate from terephthalic acid or a derivative, such as, for example, a dihalide or a diester.

The units of formula (II) are obtained from 2-methylpentamethylene-1,5-diamine. With regard to the optional units of formula (III), these are derived from 2-ethyltetramethylene-1,4-diamine. The synthesis of the 2-methylpentamethylenediamine used may be carried out by hydrogenation of 2-methylglutaric acid dinitrile in accordance with known processes. Similarly, the synthesis of 2-ethyltetramethylenediamine may be carried out by hydrogenation of 2-ethylsuccinic acid dinitrile.

With regard to the units of formula (IV), these originate from hexamethylene-1,6-diamine.

With regard to the non-conforming units, their structure is derived from bis-hexamethylenetriamine $H_2N$-($CH_2)_6$-$N$-($CH_2)_6$-$NH_2$. These non-conforming units of structure (v) represented by: —HN—($CH_2)_6$—NH—($CH_2)_6$—NH— and/or —HN—($CH_2)_6$—N—($CH_2)_6$—NH—are formed during the polycondensation reaction by a dimerisation reaction of the hexamethylenediamine starting material and/or its derivative involved in the polycondensation reaction and having a single free $NH_2$ group. The presence of the non-conforming units in amounts greater than 0.5% by weight has the effect, in particular, of causing an undesirable increase in the viscosity characteristics, in the finished copolyamide.

The copolyamides according to the present invention may be prepared by application of polycondensation processes well known to experts in the polymer field: polycondensation by a thermal route, carrying out the reaction in the molten mass or in the presence of an organic solvent or solvents, from the diacid (terephthalic acid; or acid reagent) and diamines (methylpentamethylenediamine+hexamethylenediamine+, optionally, ethyltetramethylenediamine; or amine reagent); polycondensation in solution or interfacial polycondensation using a dihalide of the diacid and diamines as starting materials.

In order to carry out this polycondensation, and this constitutes further subjects of the present invention, it is preferred to employ the thermal route.

A first convenient process of this type, which applies very preferentially when the composition of the starting reagents comprises 40 to 60 mol % of hexamethylenediamine in the mixture of diamines, comprises the technique of polycondensation in the molten mass, according to which a starting composition: * containing: (i) either stoichiometric amounts, or close to stoichiometric amounts, of diacid and diamines supplying equal or virtually equal numbers of COOH and $NH_2$ groups, or their stoichiometric salt(s) with, optionally, an excess of diacid and/or of diamine(s) in the free state, (2i) water in an amount sufficient to allow the distillation in step 1 indicated below to be carried out under the specific temperature (T1 and T2) and pressure (P) conditions also indicated below, and (3i), optionally, a catalyst, * is polycondensed by carrying out the reaction in a closed system of the autoclave type, and * by linking the following steps:

Step 1: in which, the autoclave being closed, the temperature of the starting composition is progressively increased up to a specific value T1 which is within the range ranging from 170° C. to 240° C.; then, under a constant pressure P equal to the autogenous water vapour pressure obtained, which is within the range ranging from 0.7 to 2.6 MPa, the water present in the reaction mass is removed by regular distillation, whilst progressively raising the temperature of the composition at the same time to a value T2 which is higher than the temperature T1 reached before distillation and is within the range ranging from 215° C. to 320° C.;

Step 2: in which the pressure is progressively lowered from the autogenous pressure value to atmospheric pressure value and, optionally, at the same time, the temperature of the composition is raised to a value T3 which is higher by ten to several tens of degrees Celsius than the temperature T2 reached before decompression, whilst continuing to ensure regular distillation of water throughout this decompression period;

Step 3: in which the polycondensation reaction is completed by stirring the reaction composition for a certain time, carrying out the reaction under atmospheric pressure and optionally/or under a lower pressure with a mass temperature equal to or higher than the temperature T2 or T3 obtained at the end of Step 2, for a sufficient period enabling a polyamide having the desired molecular and viscosity characteristics to be obtained.

The expression "water present in the reaction composition", which is used above in Step 1 with reference to the distillation, is understood to define the water contained in the starting compositions plus the water which may form as a result of the polycondensation reaction of the acid reagent and the amine reagent. The amount of water contained in the starting compositions is not critical from the point where it enables the distillation in Step 1 to be conducted under the particular temperature (T1 and T2) and autogenous pressure (P) conditions indicated above; this amount of water may be determined easily by a person skilled in the art on the basis of his ordinary knowledge and with the aid of simple tests.

In order to carry out Step 1 of the polycondensation process which has just been described, it is possible to use starting compositions which are in the form of mixtures: either based on the acid reagent, the amine reagent, water and, optionally, catalysts, the acid reagent being used in the solid form and the amine reagent being used, for example, in the form in which it naturally occurs or in the form of an aqueous solution; or based on the diacid salt or salts and diamine, water and, optionally, diacid and/or diamine(s) in the free state and catalysts, the salt or salts being used, for example, in the solid form, in aqueous dispersion or in the form of an aqueous solution.

With regard to the catalyst (3i) which may be used, this generally consists either of a compound ($\Delta$) or of a compound ($\beta$), ($\alpha$) denoting an inorganic oxygen-containing monoacid or polyacid or an organic oxygen-containing monoacid or polyacid other than a carboxylic acid, at least one of the acid groups of which has an ionisation constant pka in water at 25° C. equal to or less than 4 and ($\beta$) denoting an alkali metal or alkaline earth salt of said acid.

The strong acids ($\alpha$) used are preferably the acids derived from phosphorus and more particularly hypophosphorous, phosphorous, orthophosphoric, pyrophosphoric, methylphosphonic, phenylphosphonic, benzylphosphonic, dimethylphosphinic, diphenylphosphinic, methylphenylphosphinic, dibenzylphosphinic, methylphosphonous, phenylphosphonous or benzylphosphonous acids.

With regard to the acid salt ($\beta$), use is generally made of alkali metals or alkaline earth metal salts derived from inorganic or organic oxyacids ($\alpha$).

Salts ($\beta$) preferably used are those which are completely soluble in the reaction mixture. Amongst these preferred salts ($\beta$), the suitable salts are the sodium and potassium salts obtained from the particular types of inorganic or organic oxyacids ($\alpha$) which are suitable and have been mentioned above. The salts ($\beta$) which are very particularly suitable are the sodium and potassium salts obtained from the preferred acids derived from phosphorus which have been mentioned by name above.

The proportions of strong acid ($\alpha$) or salt ($\beta$), expressed as a percentage by weight with respect to the final copolyamide, are generally between 0.01 and 1% and preferably between 0.01 and 0.5%.

With regard to the way in which Step 1 of the polycondensation process under discussion is conducted, it should be noted that the progressive heating of the starting composition up to the temperature T1 may be carried out over a period ranging, for example, from 10 minutes to 2 hours. With regard to the distillation under constant autogenous pressure P, this is carried out over a period of time ranging, for example, from 30 minutes to 3 hours 30 minutes.

When carrying out Step 1, it will be preferred (and this preference relates only to Step 1 of the first convenient process) to carry out the distillation under a constant autogenous pressure P which is within the range ranging from 0.9 to 1.8 MPa, choosing: a temperature T1 at the start of distillation which is within the range ranging from 190° C. to 215° C. and a temperature T2 just before decompression which is within the range ranging from 235° C. to 310° C. and still more preferentially ranging from 265° C. to 300° C.

When carrying out Step 2, the decompression, which may proceed in successive stages, is carried out over a period ranging, for example, from 20 minutes to 2 hours 30 minutes and, preferably, the temperature of the reaction mass is raised at the same time to a value T3 which is, for example, within the range ranging from 300° C. to 340° C.

When carrying out Step 3, the polycondensation reaction is terminated by allowing the reaction mass to react at the temperature T3 or at a temperature which may be higher, by a few degrees to about ten degrees, than T3, preferably working under a reduced pressure which is within the range ranging from $1.10^2$ to $1000.10^2$ Pa for a period of time (including the time for applying reduced pressure) ranging, for example, from 10 minutes to 3 hours.

A second convenient process for mass polycondensation, which also applies satisfactorily whatever the proportions of hexamethylenediamine in the mixture of diamines, consists in subjecting the starting composition, which has been defined above, to a polycondensation reaction using Step 1 of the first convenient process, which has just been defined, and then linking the following steps:

Step 2': in which the reactor is emptied rapidly, over a period ranging from 5 minutes to 30 minutes: during this period, the autogenous water vapour pressure is lowered from the autogenous pressure value to atmospheric pressure value and, working under an inert atmosphere (nitrogen), the prepolymer formed is recovered and then cooled and converted to a powder by grinding;

Step 3': in which the reaction for completion of the polycondensation is carried out by conducting the post-condensation of the prepolymer in powder form obtained either in the solid phase, working in a reactor kept under a pressure, optionally in the presence of inert gas (nitrogen), of between the atmospheric pressure value and a lower value of $0.1.10^2$ Pa, at a temperature ranging from 200° C. to 280° C. and for a sufficient period enabling a copolyamide to be obtained, having the desired molecular and viscosity characteristics, ranging, for example, from 10 minutes to 5 hours; or in the molten phase, working in an extruder-degasser containing one or more screws, the essential operating parameters of the said extruder-degasset comprising: the temperature of the reaction zone, which is within the range ranging from 310° C. to 360° C., the devolatilisation pressure for this zone, which is within the range ranging from the atmospheric pressure value to a lower value of $0.1.10^2$ Pa, and the residence time of the prepolymer in the extruder-degasset, which is within the range ranging from 30 seconds to 5 minutes; or by linking post-condensation in the molten phase and post-condensation in the solid phase.

A third convenient process, which again also applies whatever the proportions of hexamethylenediamine in the mixture of diamines, comprises the thermal polycondensation technique conducted in solution, according to which the following steps are linked:

Step 1": conducted under an inert atmosphere (nitrogen), in which step the starting composition, containing the elements (i) and (3i), which have been referred to above with regard to the starting mixture for the first and second processes, is dissolved in an aprotic polar solvent or a mixture of such solvents having a boiling point higher than 220° C., working at ambient temperature of 20° C. to 30° C., the temperature of the solution obtained is then raised to the desired reaction temperature of between 190° C. and 220° C. and the water of amidification is removed by regular distillation under atmospheric pressure for a period ranging from 20 minutes to 2 hours;

Step 2": again conducted under an inert atmosphere, in which step the temperature of the reaction solution is raised to a value above the boiling point of the solvent or solvents used and the remainder of the water of amidification and the solvent or solvents present are then removed, again by distillation under atmospheric pressure;

Step 3": in which, once the solvent or solvents have been removed, the polycondensation is completed by allowing the reaction mass to react at a temperature ranging from 300° to 340° C., operating under a reduced pressure which is within the range ranging from $0.1.10^2$ Pa to $1.10^2$ Pa for a sufficient period (including the period for applying reduced pressure) enabling a copolyamide to be obtained having the desired molecular and viscosity characteristics, ranging, for example, from 10 minutes to 1 hour.

Suitable solvents are, in particular, 1,3-dimethyl-2-imidazolidone, 1,3-dimethyl-3,4,5,6-tetrahydro-2-pyrimidone, tetramethylsulphone, diphenyl sulphoxide and a mixture of these solvents.

The processes which have Just been described may be applied to compositions comprising either stoichiometric amounts of an acid reagent and an amide reagent supplying equal numbers of COOH and $NH_2$ groups, or their stoichiometric salt(s).

It may be advantageous to use amounts of amine reagent which are higher than those Just necessary to obtain equivalents between the COOH and $NH_2$ groups in the starting compositions, so as to introduce into the reaction mass an excess of diamine(s), making it possible to compensate for the loss of this reagent, which is essentially involved during the distillation operation under constant pressure (Step(s) 1 or 1"+2") and then during the decompression operation (Step 2 or 2'). Within the framework of this advantageous method, the excess amine reagent, expressed by the molar percentage of amine reagent in excess in accordance with the relationship:

$$\frac{\text{total number of mols of amine reagent } - \text{ number of mols of amine reagent necessary for stoichiometry}}{\text{number of mols of amine reagent necessary for stoichiometry}} \times 100$$

is usually within the range ranging from 0.5 to 6% and preferably ranging from 1 to 4%.

The processes which have just been described offer a possibility for preparing semi-crystalline, semi-aromatic copolyamides from an amine reagent comprising an alkylpentamethylenediamine and hexamethylenediamine, reducing the development of parasitic reactions (which will be mentioned further below) which involve these diamines and give rise, in particular, to a loss in total basicity.

2-Methylpentamethylene-1,5-diamine is a compound which cyclises easily; this cyclisation, when it relates to the free diamine, gives rise to 3-methylpiperidine (which product is termed "free cyclic amine" below) with liberation of ammonia $NH_3$, and when it relates to the diamine involved in the amidification reactions by only one of its functional groups, it acts as a chain-limiting mechanism giving rise to blocking groups of formula:

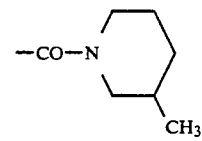

also with liberation of ammonia. The free cyclic amine formed is recovered essentially at the time at which the water is removed by distillation under constant pressure (Step(s) 1 or 1"+2") and then during decompression (Step 2 or 2'). Another parasitic reaction consists in the loss of amine reagent (in particular 2-methylpentamethylenediamine and hexamethylenediamine) by entrainment, which occurs essentially at the time when the water present is. removed by distillation under constant pressure (Step(s) 1 or 1"+2") and then during decompression (Step 2 or 2'). The result of these parasitic reactions therefore manifests itself in two adverse effects:

on the one hand, a loss of total basicity involving, on the one hand, a loss of stoichiometry during the polycondensation reaction between the primary amino groups and the carboxyl groups which are reacting, consequently precluding the possibility of easily increasing the molecular mass of the polyamide being formed, and, on the other hand, a real difficulty for industrial reproduction of the process employed. The loss in total basicity which has been mentioned above is established with respect to the total amount of amine reagent employed and is expressed by the equation:

$$\frac{\text{basicity lost}}{\text{basicity employed}} \times 100 \quad \text{in which:}$$

the expression "basicity lost" corresponds to the sum: number of NH$_2$ equivalents of the amine reagent lost during distillation + number of NH equivalents of free cyclic amine + number of NH$_2$ equivalents of ammonia. This lost basicity is determined directly, by means of a potentiometric determination, on the distillates, that is to say all of the water condensed during the distillation stages under constant pressure and during decompression;

the expression "basicity used" corresponds to the number of NH$_2$ equivalents of the amine reagent used. The expression "number of equivalents" of primary or secondary amino of a compound defines the number of primary or secondary amino groups contained in one mol of the said compound; for example one mol of amine reagent comprising 2-methylpentamethylenediamine contains 2 primary amino equivalents NH$_2$ whereas one mol of cyclic amine comprising 3-methylpiperidine contains one secondary amino equivalent NH:

and, on the other hand, the existence in the polycondensation mixture of a high proportion of terminal groups of the cyclic amine type, which have the role of limiting the chain and may limit access to high molecular masses.

Using the process which have just been described for the preparation of semi-aromatic copolyamides, a limited loss of total basicity is obtained, which may be at values of less than 6% and may reach values as low as those between 1 and 4%. Also, copolyamides are obtained which have a limiting proportion of terminal groups of the cyclic amine type, which act as chain limiter, which proportion may be at values of less than 70 milliequivalents per kilogram of polymer (meq/kg) and may reach values as low as those between 2 and 50 meq/kg; the determination of these proportions of terminal groups of the cyclic amine type is carried out in accordance with the indications given below.

One or more additive(s) customarily used during the preparation of polyamides may be added to the copolyamides of the invention, before, during or towards the end of the polycondensation reaction. These additives are, for example, antioxidants, flame retardants, light stabilisers, heat stabilisers, mould-release agents, optical brighteners, colorants and the like.

It is also possible to use padding or reinforcing fillers, which may be added to the copolyamides using techniques which make use of the mixture of powders and/or granules, or, alternatively, may be incorporated therein in the molten jet, by remelting the copolyamides in suitable equipment, such as, for example, an extruder. The fillers which may be added are very diverse. They may be a fibrous material such as: asbestos fibres, carbon fibres, metal carbide or nitride or metalloid carbide or nitride fibres, such as silicon carbide, silicon nitride or boron carbide fibres; glass fibres; organic fibres able to withstand heat; and mixtures of two or more than two of the abovementioned fibrous materials. The filler may also consist, in particular, of: glass microspheres; mica flakes; talc; or combinations of two or more than two of the abovementioned non-fibrous materials; or combinations of at least one fibrous material with at least one of the abovementioned non-fibrous materials. Amongst these fillers, glass fibres are particularly preferred. These glass fibres may be ordinary glass fibres or treated glass fibres, for example glass fibres treated with the aid of silane. In general, these glass fibres have a diameter of between 3 and 30 μm and a length of less than 10 mm.

The compositions thus obtained (and these comprise another subject of the present invention), containing a copolyamide and at least one filler, may easily be converted, for example by injection moulding; these compositions may contain one (or more) filler(s) in an amount which may reach 80% of the weight of the polymer + filler(s) system. The proportion of filler(s) is preferably between 10% and 60% and still more preferentially between 30% and 60%.

The copolyamides according to the invention may be converted using conventional machines, for example injection, extrusion or spinning machines, to give shaped objects such as, in particular, massive moulded articles, filaments or fills. With regard to the conversion conditions, the copolyamides according to the invention, optionally containing fillers, may, for example, be injected easily using a material temperature which is not too high, such as those ranging, for example, from 310° to 350° C.

The examples which follow show, in a non-limiting manner, how the present invention may be implemented.

In these examples, some checks are carried out. The methods by which they are carried out are indicated below:

DETERMINATION OF THE PROPORTION OF TERMINAL COOH GROUPS (COOH TG) and NH$_2$ GROUPS (NH$_2$ TG) IN THE POLYMER:

This determination is carried out by potentiometric determination of a polymer solution using 0.02N trifluoromethanesulphonic acid. The method permits the simultaneous determination of COOH and NH$_2$ groups by the addition of a 0.05N solution of tetrabutylammonium hydroxide in nitrobenzene. The results are expressed in milliequivalents per kilogram of polymer (meq/kg).

DETERMINATION OF METHYLPIPERIDINE IN THE POLYMER:

The determination of 3-methylpiperidine (MPP) in the polymer is carried out by gas phase chromatography. The principle of the method is as follows:

the polymer first undergoes hydrolysis in hydrochloric acid and is then neutralised with sodium hydroxide solution to a slightly basic pH, the amines are then extracted quantitatively with chloroform, and this chloroform extract is finally analysed by gas phase chromatography and the 3-methylpiperidine is determined by the internal standard methods. The number of terminal MPP groups (MPP TG) in the polymer is in this case also expressed in meq/kg.

DETERMINATION OF BIS-HEXAMETHYLENETRIAMINE (BHT) IN THE POLYMER:

This determination is carried out by gas phase chromatography. The principle of the method is as follows:

the polymer first undergoes hydrolysis in hydrochloric acid and is then neutralised with sodium hydroxide solution to a slightly basic pH, the amines are then extracted quantitatively with chloroform and the chloroform extract obtained is concentrated by evaporation of chloroform, and then the concentrated solution obtained is finally analysed by gas phase chromatography and the BHT is determined by the internal standard method. The BHT content will be given in millimoles per kilogram of polymer (mM/kg) and in % by weight in the polymer (1 mM of BHT=0,215 g).

DETERMINATION OF THE VISCOSITY INDEX (IV) FOR THE POLYMER:

This index is determined at 25° C. in accordance with international standard ISO 307, 2nd Edition, 1984, on a solution containing 0.5 g of polymer (dried for 2 hours at 60° C. while sweeping with argon) in 100 cm$^3$ of metacresol. For polymers rich in hexamethylenediamine, in the case where the polymer may not be dissolved in metacresol, a concentrated 95% by weight $H_2SO_4$ is then used.

DETERMINATION OF THE LOST BASICITY IN THE DISTILLATES:

The basicity is determined by simple potentiometric determination by HCl on all of the water condensed during the distillation stages under constant pressure and during decompression.

DETERMINATION OF THE THERMAL CHARACTERISTICS OF THE POLYMER:

This determination of the thermal characteristics is carried out by differential calorimetric analysis (DSC) using a Mettler type TA 3000 DSC 30 apparatus. The determination is carried out under nitrogen in three steps (heat cycle):

rise from 25° C. to 350° C. at a rate of 10° C./min; holding for 2 minutes at 350° C.; this step serves to obliterate the thermal history of the polymer;

lowering from 350° C. to 25° C. at a rate of 10° C./min; this step serves to obtain the crystallisation temperature on cooling (Tcr);

reheating from 25° C. to 350° C. at a rate of 10° C./min; this step serves to obtain the glass transition temperature (Tg) and the melting point (m.p.) of the polymer.

EXAMPLE 1

In this example the preparation of a semicrystalline copolyamide from terephthalic acid, 2-methylpentamethylenediamine and hexamethylenediamine (50 mol % in the mixture of diamines) by the molten mass process termed the "first convenient process" is described.

1) Preparation of the diamines (2-methylpentamethylenediamine and hexamethylenediamine)/terephthalic acid salt in aqueous solution:

The reaction is carried out in a 10 liter glass reactor equipped with:

a heating system, an anchor-type stirrer, a system allowing sweeping with nitrogen and maintenance of an oxygen-free atmosphere, and a system enabling condensation of the volatile products.

The following are introduced cold into the reactor, which is kept swept under a gentle stream of nitrogen:

1079.7 g of terephthalic acid (6.504 mols), 793.6 g of 2-methylpentamethylenediamine (6.841 tools), 1834.1 g of dry crystalline hexamethylenediamine/-terephthalic acid salt (6,509 mols), 3.8 g of hexamethylenediamine (0.033 mol), and 3707 g of distilled water.

The temperature of the composition is raised to 75° C. and the mixture is stirred for 2 hours, maintaining sweeping with nitrogen. The pH of a 10% by weight aqueous salt solution is then determined at 20° C. A pH of 9.18 is obtained; in this example a 5.18% molar excess of 2-methylpentamethylenediamine and a 2.84% molar excess of amine reagent are used.

2) Polycondensation in an autoclave:

The apparatus used consists of a 7.5 liter stainless steel stirred autoclave equipped to operate at up to 340° C. and a pressure of 2.2 MPa. It is provided with:

a double-walled heating system operating by a heat transfer fluid, a frame-type stirrer, a system enabling the autoclave to be placed under nitrogen pressure, a circuit enabling the volatile products to be condensed and collected, and a device for establishing a pressure lower than atmospheric pressure.

7,361 kg of the aqueous salt solution prepared above are introduced with 3.2 g of a 50% by weight aqueous hypophosphorous acid solution. After purging 3 times with nitrogen by establishing a pressure of $4.10^5$ Pa followed by decompression, the aqueous salt solution is concentrated from 50% by weight to 72.7% by weight in the course of 40 minutes, by evaporation, under a constant pressure of $9.10^5$ Pa, of some of the water present in the mixture; the temperature then reaches 184.3° C.

Afterwards the following steps are carried out successively:

Step 1

The temperature of the 72.7% by weight aqueous salt solution is raised to T1=209.2° C. in the course of 50 minutes while maintaining the autogenous pressure. A pressure of 1.65 MPa is then reached. The water present in the reaction composition is then distilled under a pressure of between 1.65 and 1.45 MPa in the course of 2 hours, so as to obtain a composition temperature of T2=282.7° C.;

Step 2

The autoclave is decompressed to atmospheric pressure in the course of 1 hour 10 minutes and, at the same tee, the temperature of the composition is raised to the value T3=306.2° C., while continuing to ensure regular distillation of water; and

Step 3

The polycondensation reaction is completed operating under atmospheric pressure with a composition temperature raised to 315° C. for a period of 45 minutes.

Stirring is stopped and a nitrogen pressure is then established in the autoclave and the polymer is withdrawn. The latter, which is extruded from the autoclave in the form of a rod, is cooled by passing into a bath of cold water and it is then granulated and dried.

3) Results:

The polymer obtained is homogenous and has the appearance of a semi-crystalline polymer. It has the following characteristics:

Molecular characteristics:

$NH_2$ TG = 35 meq/kg;

-continued

| Molecular characteristics: |
|---|
| COOH TG = 84 meq/kg; |
| MPP TG = 25 meq/kg; |
| BHT content = 9.9 mM/kg, or 0.213% by weight; | the calculated number-average molecular mass is 14,914 g/mol;
IV (m-cresol) = 120 ml/g;
basicity losses in the distillates; 0.5886 amino equivalents, giving a total basicity loss of 2.19%.

| Thermal properties: |
|---|
| Tg = 135° C.; |
| Tcr = 251° C. |
| m.p. = 300° C.; |
| difference ΔT = m.p. - Tcr is 49° C. |

Thermomechanical values:

The polymer obtained is mixed with 4.5 mm long glass fibre 429 YZ from OWENS CORNING, introduced as a molten Jet into a LEISTRITZ co-rotating twin-screw extruder-degasser containing screws having a diameter D of 34 mm and a length of 35 D, and comprising: a feed zone, a heated mixing zone (comprising a degassing well) and a die. The glass fibre content represents 40% by weight of the total polymer+glass fibres. The main operating parameters of the extruder-degasser are as follows:

| | |
|---|---|
| temperature of the mixing zone | 310° C., |
| temperature of the die | 300° C., |
| devolatilisation pressure | $200.10^2$ Pa, |
| speed of rotation of the screw | 150 revs/min, |
| flow rate of the material | 9 kg/hour, |
| residence time | 2 minutes. |

The filled polymer, which is collected at the extruder outlet in the form of a rod, is cooled rapidly in a water bath at 20° C. and is then cut into granules, which are packed in a sealed bag to prevent any moisture being taken up again before injection moulding.

The injection-moulded test pieces have a bending temperature under load (BTUL) of 261° C. under 1.8 MPa in accordance with the standard NFT 51005.

With regard to the moulding of the test pieces, this is carried out on a BATTEN[ELD machine under the following conditions:

| | |
|---|---|
| temperature of the material | 315° C., |
| temperature of the mould | 140° C. (injection termed cold mould injection), |
| injection pressure | 100 MPa, |
| holding pressure | 35 MPa, |
| cooling time | 25 seconds, |
| cycle time | 50 seconds, |
| injection flow rate | 7.5 cm³/second. |

Comparative Example

In this comparative example it is shown that in the absence of hexamethylenediamine in the starting composition the homopolymer based on terephthalic acid and 2-methylpentamethylenediamine which is synthesised has, when it is loaded with 40% by weight of glass fibre and when it is injected in a cold mould, a BTUL which is well below 240° C.

The semi-crystalline homopolyamide derived from terephthalic acid and 2-methylpentamethylenediamine is prepared by a process in the molten mass, of the type described in Example 1 above:

1) Preparation of the terephthalic acid/2-methylpentamethylenediamine salt in aqueous solution:

The reaction is carried out in a 500 liter reactor equipped with:
a heating system,
a system permitting sweeping with nitrogen and maintenance of an oxygen-free atmosphere, and
a helical stirrer.

The following are introduced cold into the reactor:
49,446 kg of terephthalic acid (297.87 mole),
35.935 kg of 2-methylpentamethylenediamine (309.79 mole), and
128.07 kg of water.

The temperature of the composition is raised to 60° C. and the mixture is stirred for 2 hours, maintaining sweeping with nitrogen. The pH then reaches a value of 9.21; in this example a 4% molar excess of 2-methylpentamethylenediamine is used.

Part of the water present in the mixture is then evaporated. The equipment used comprises a 400 liter non-stirred stainless steel autoclave equipped to operate at up to 130° C. and at a pressure of 0.8 MPa. It is provided with:
a heating system,
a system enabling it to be placed under nitrogen, and
a circuit permitting condensation and collection of the volatile products.

All of the aqueous salt solution prepared above is transferred into this autoclave. After purging 3 times with nitrogen by application of a pressure of $4.10^5$ Pa followed by decompression, the aqueous salt solution is concentrated from 40% to 69.2% by weight in the course of 30 minutes, by evaporation, under atmospheric pressure, of some of the water present in the mixture; the temperature then reaches 103° C.

2) Polycondensation in an autoclave:

The apparatus used comprises a 200 liter stirred stainless steel autoclave equipped to operate at up to 320° C. and at a pressure of 2.2 MPa. It is provided with:
a double-walled heating system operating by a heat transfer fluid,
an anchor-type stirrer,
a system allowing the autoclave to be placed under nitrogen pressure,
a circuit enabling the volatile products to be condensed and collected,
and a device for establishing a pressure lower than atmospheric pressure.

All of the aqueous solution concentrated to 69.2% by weight of salt is transferred to this autoclave. The procedure is then in accordance with the same method as that indicated in Example 1, with the following variations:

In Step 1

The temperature of the aqueous 72.7% by weight salt solution is raised to T1=180° C. in the course of 20 minutes, maintaining the autogenous pressure. A pressure of 0.85 MPa is then reached. The water present in the reaction composition is then distilled under a constant pressure of 0.85 MPa in the course of 2 hours 45 minutes so as to obtain a composition temperature of T2=275° C.;

In Step 2

The autoclave is decompressed down to atmospheric pressure in the course of 1 hour 10 minutes and, at the same time, the temperature is raised to 298° C. while continuing to ensure regular distillation of water; and

In Step 3

The application of a reduced pressure of $533.10^2$ Pa is then established in the course of 22 minutes, whilst at the same time raising the temperature of the composition to 300° C., and the polycondensation is completed by continuing to stir the composition at 300° C. under $533.10^2$ Pa for a further 20 minutes.

3) Results:

in respect of the molecular characteristics of the polymer:

$NH_2$ TG = 68.8 meq/kg;
COOH TG = 36.1 meq/kg;
MPP TG = 15 meq/kg;

the calculated number-average molecular mass is 13899 g/mol;

IV (m-cresol) = 105.1 ml/g;

basicity losses in distillates: 1.7177 amino equivalent, which gives a total basicity loss of 2.39%;

with regard to the thermal properties:
$Tg$ = 143° C.;
$Tcr$ = 174° C.;
m.p. = 285° C.;
the difference $\Delta T$ = m.p. - Tcr is 111° C.;

with regard to the thermomechanical characteristics of the polymer filled with 40% by weight of glass fibres:

* Operating parameters of the extruder-degasser having been modified with respect to the data in Example 1:
temperature in the mixing zone, 295° C.,
temperature of the die: 290° C.;

* Conditions for moulding test pieces having been modified with respect to the data in Example 1:
temperature of the material: 295° C.,
injection pressure: 80 MPa.

* BTUL = 146° C.

EXAMPLE 2

In this example the preparation of a semi-crystalline copolyamide from terephthalic acid, 2-methylpentamethylenediamine and hexamethylenediamine (60 mol % in the mixture of diamines) by the thermal polycondensation process conducted in solution termed the "third convenient process" is described.

1) Preparation of the reagents

The reaction is carried out in a small 100 ml cylindrical glass reactor provided with an anchor-type stirrer. The reactor is heated by immersing the latter in a bath of Lipowitz alloy heated to above 180° C. The reactor is also equipped with:

a system permitting sweeping with nitrogen, a circuit per, hitting condensation and collection of the volatile products, and a device for establishing a pressure lower than atmospheric pressure.

The following are introduced cold into the reactor:

13.75 g of dry and crystalline hexamethylenediamine/terephthalic acid salt (0.04876 mol), 5.40 g of terephthalic acid (0.03253 mol), 3.96 g of 2-methylpentamethylenediamine (0.03414 mol), and 30 g of 1,3-dimethyl-2-imidazolidone.

The charges correspond to a 4.99% molar excess of 2-methylpentamethylenediamine, which is a 1.98% molar excess of amine reagent.

2) Polycondensation:

The following steps are carried out successively:

Step 1''

Under a nitrogen atmosphere, the temperature is raised to 215° C. and the water of amidification is removed by regular distillation under atmospheric pressure over a period of 30 minutes;

Step 2''

Under a nitrogen atmosphere the temperature of the reaction composition is raised to 260° C. and the remainder of the water and the solvent are removed by distillation under atmospheric pressure over a period of 45 minutes;

Step 3''

The polycondensation reaction is completed by allowing the reaction composition, which has been heated to a temperature of 330° C., to react, operating under a reduced pressure of $0.1.10^2$ Pa for a period of 15 minutes.

3) Results:

The polymer obtained is homogeneous and has a semi-crystalline appearance. It has the following characteristics:

Molecular characteristics:
VI (m-cresol) = 82.3 ml/g;
basicity losses in the distillates:
$9.48.10^{-3}$ amino equivalents, which gives a total basicity loss of 5.72%.

thermal properties:
$Tg$ = 140° C.;
$Tcr$ = 296° C.;
m.p. = 320° C.;
the difference $\Delta T$ = m.p. - Tcr is 24° C.

EXAMPLE 3

In this example the preparation of a semicrystalline copolyamide from terephthalic acid, 2-methylpentamethylenediamine and hexamethylenediamine (70 mol % in the mixture of diamines) by the mass process termed the "second convenient process" is described.

1) Preparation of the diamines (2-methylpentamethylenediamine and hexamethylenediamine)/terephthalic acid salt in aqueous solution:

The reaction is carried out in a 2 liter glass reactor equipped with:

a heating system, an anchor-type stirrer, a system allowing sweeping with nitrogen and maintenance of an oxygen-free atmosphere, and a system permitting condensation of the volatile products.

The following are introduced cold into the reactor, which is swept with a gentle stream of nitrogen:

350 g of hexamethylenediamine/terephthalic acid salt (1.2411 mols), 88.3 g of terephthalic acid (0.5319 mol), 66.7 g of 2-methylpentamethylenediamine (0.5750 mol) and 500 g of water.

A pH of 9.20 is obtained; in this example an 8.1% molar excess of 2-methylpentamethylenediamine is used, which is a 2.43% molar excess of amine reagent.

2) Polycondensation in an autoclave:

The equipment used consists of a stirred 1 liter stainless steel autoclave equipped to operate at up to 340° C. and a pressure of 3 MPa. It is provided with:

a double-walled heating system operating by a heat transfer fluid, a frame-type stirrer, a system allowing the autoclave to be placed under nitrogen pressure, a circuit enabling the volatile products to be condensed and collected, and a device for establishing a pressure lower than atmospheric pressure.

820 g of the aqueous salt solution prepared above are introduced with 0.35 g of a 50% by weight aqueous hypophosphorous acid solution.

The procedure is exactly as indicated above in Example 1 up to the end of Step 1, with only the following variations:

the aqueous salt solution is concentrated from 49.75% by weight to 69.3% by weight; the temperature then reaches 194° C.;

in Step 1 the temperature at the start of distillation is 229° C., the heating period then being 20 minutes and an autogenous pressure of 1.8 MPa is reached. The water present in the reaction composition is then distilled under this pressure in the course of 1 hour 35 minutes and the temperature T2 reached at the end of this period is 224° C.

Afterwards, the following steps are carried out successively:

Step 2':

The reactor is emptied rapidly in the course of 10 minutes; during this period the water vapour pressure is lowered from the autogenous pressure to the atmospheric pressure value. The polymer formed, which is a prepolymer, is recovered and it is then cooled and converted to fine powder by grinding.

The prepolymer obtained has a semicrystalline appearance. It has the following molecular characteristics:

| | |
|---|---|
| NH$_2$ TG = | 122.5 meq/kg; |
| COOH TG = | 123 meq/kg; |
| MPP TG = | 5 meq/kg; |

BHT content = 2.7 mM/kg, or 0.058% by weight;

the calculated number-average molecular mass is 8071 g/mol;

VI (H$_2$SO$_4$) = 14.2 ml/g;

basicity losses in the distillates: 0.1235 amino equivalent, which gives a total basicity loss of 3.41%.

Step 3':

The reaction for completion of the polycondensation is effected by carrying out the postcondensation in the solid phase of the prepolymer in powder form obtained.

The reaction is carried out in a small 100 ml cylindrical glass reactor provided with an anchor-type stirrer. The reactor is heated by immersing the latter in a bath of Lipowitz alloy heated to above 180° C. The reactor is also equipped with:

a system allowing sweeping with nitrogen, and a device for applying a pressure below atmospheric pressure.

25 g of prepolymer powder are introduced cold into the reactor and the reactor is then swept with nitrogen in order to remove all traces of oxygen and finally the temperature is raised to 260° C. under a reduced pressure of 0.66.10$^2$ Pa for a period of 2 hours 30 minutes.

3) Result:

The polymer obtained has a semi-crystalline appearance. It has the following characteristics:

molecular characteristics:

VI (H$_2$SO$_4$) = 148 ml/g;

thermal properties:

Tg = 127° C.;

Tcr = 310° C.;

m.p. = 322° C. and 344° C.;

the difference $\Delta T$ = m.p. - Tcr has values of 12° C. and 34° C.

We claim:

1. Semi-crystalline, semi-aromatic copolyamide obtained from terephthalic acid or a derivative and 2-methylpentamethylenediamine, which copolyamide has a glass transition temperature Tg of at least 120° C. and a bending temperature under load under 1.8 megapascal of at least 240° C. when the copolyamide is filled with at least 10 to 60% of a padding or reinforcing filler of fibrous nature and then molded, a viscosity index of at least 60 ml/g and a number average molecular weight of at least 9000 g/mol, the said copolyamide having recurring units of formula (I) , (II) , (III), (IV), and (V):

(I) denoting the structure:

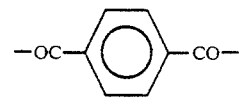

(II) denoting the structure:

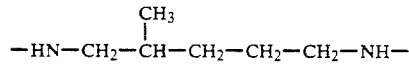

(III) denoting the structure:

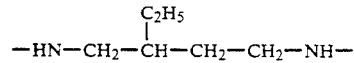

(IV) denoting the structure:

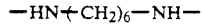

(V) denoting the structure derived from bis-hexamethylenetriamine;

the molecular ratio of units (I) with respect to the sum of the units (II)+(III)+(IV) is 1;

the amount of units (III) in the mixture (II)+(III) is in the range ranging from 0 to 5 mol % and that of the units (II), with respect to the same reference, is in the range ranging from 100 to 95 mol %;

the amount of units (IV) in the mixture (II)+(III)+(IV) is in the range ranging from 40 to 90 mol %; and also having a proportion of the units (V) derived from bis-hexamethylenetriamine, expressed as a percentage by weight of bis-hexamethylenetriamine with respect to the weight of the copolyamide obtained, which is less than 0.5%.

2. Copolyamide according to claim 1, having a structure in which the amount of units (IV) in the mixture (II)+(III)+(IV) is within the range ranging from 45 to 75 mol %.

3. Shaped article selected from the group consisting of a molded article, a filament, and a film, obtained from the colpolyamide according to any one of the above claims 1 to 2.

4. Semi-crystalline, semi-aromatic copolyamide obtained from terephthalic acid or a derivative and 2-methylpentamethylenediamine, which copolyamide has a glass transition temperature $T_g$ of at least 120° C. and a bending temperature under load under 1.8 megapascal of at least 240° C. when the copolyamide is filled with at least 10 to 60% of a padding or reinforcing filler of fibrous nature and then molded, a viscosity index of at least 60 ml/g and a number average molecular weight of at least 9000 g/mol, the said copolyamide having recurring units of formula (I), (II), (III) and (IV):

(I) denoting the structure:

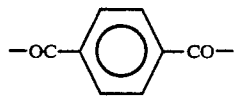

(II) denoting the structure:

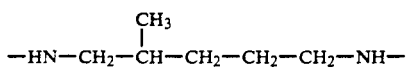

(III) denoting the structure:

(IV) denoting the structure derived from bis-hexamethylenetriamine;

the molecular ratio of units (I) with respect to the sum of the units (II)+(III) is 1;

the amount of units (III) in the mixture (II)+(III) is in the range from 40 to 90 mol %; and also having a proportion of the units (IV) derived from bis-hexamethylenetriamine, expressed as a percentage by weight of bis-hexamethylenetriamine with respect to the weight of the copolyamide obtained, which is less than 0.5%.

5. A copolyamide according to claim 1, having a structure in which the amount of units (III) in the mixture (II)+(III) is in the range ranging from 45 to 75 mol %.

6. A shaped article according to any one of the above claims 4 or 5.

* * * * *